(12) United States Patent
Mahajan

(10) Patent No.: US 11,245,971 B1
(45) Date of Patent: Feb. 8, 2022

(54) SUPPORTING OPTICAL LINE TERMINALS OF A PASSIVE OPTICAL NETWORK

(71) Applicant: Juniper Networks, Inc., Sunnyvale, CA (US)

(72) Inventor: Sanjeev Anandrao Mahajan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/187,026

(22) Filed: Feb. 26, 2021

(51) Int. Cl.
*H04Q 11/00* (2006.01)
*H04B 10/27* (2013.01)

(52) U.S. Cl.
CPC ......... *H04Q 11/0005* (2013.01); *H04B 10/27* (2013.01); *H04Q 11/0062* (2013.01)

(58) Field of Classification Search
CPC ............................. H04Q 11/0005; H04B 10/27
See application file for complete search history.

(56) References Cited

U.S. PATENT DOCUMENTS

| 2002/0071149 | A1* | 6/2002 | Xu | H04J 14/0247 398/5 |
| 2013/0259482 | A1* | 10/2013 | Sarashina | H04J 14/0267 398/67 |
| 2020/0120408 | A1 | 4/2020 | Boyd et al. | |

FOREIGN PATENT DOCUMENTS

CA  2941538 C  9/2015

\* cited by examiner

*Primary Examiner* — Shi K Li
(74) *Attorney, Agent, or Firm* — Harrity & Harrity, LLP

(57) ABSTRACT

A first network device may configure a first bridge connecting a passive optical network (PON) controller and first optical line terminals (OLTs) of the first network device. The first network device may be associated with a PON and each of the first OLTs may be connected to a first plurality of optical network units (ONUs). The first network device may establish a connection between the first bridge and a second bridge of a second network device. The second network device is associated with the PON, the second bridge may connect with second OLTs of the second network device, and each of the second OLTs may connect to a second plurality of ONUs. The PON controller of first network device may receive traffic from a PON domain manager and may provide the traffic to the first OLTs and the first plurality of ONUs via the first bridge.

20 Claims, 10 Drawing Sheets

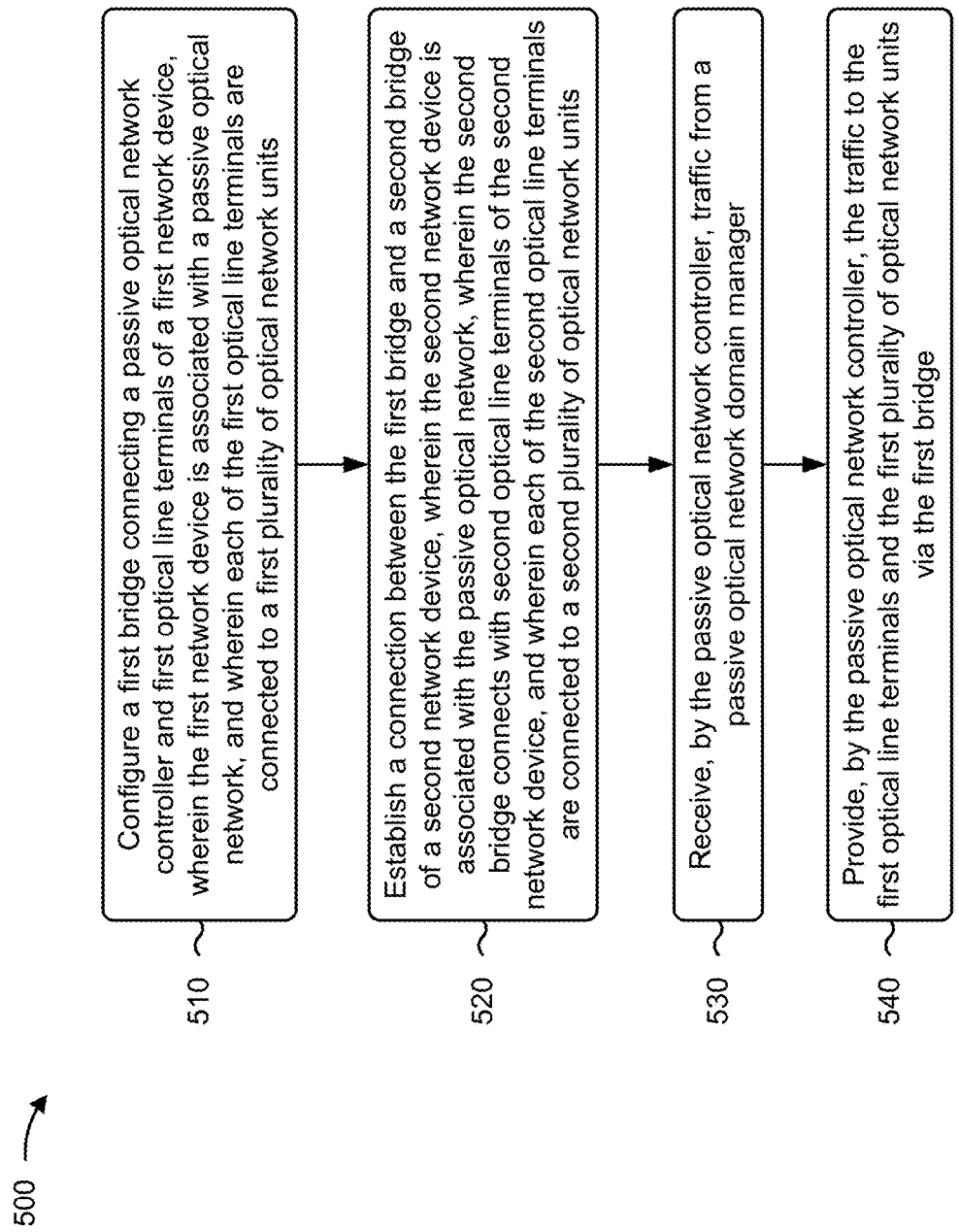

SUPPORTING OPTICAL LINE TERMINALS OF A PASSIVE OPTICAL NETWORK

BACKGROUND

A passive optical network (PON) is a fiber-optic telecommunications technology for delivering network access to end users. A PON implements a point-to-multipoint topology, in which a single optical fiber serves multiple endpoints by using unpowered (e.g., passive) fiber optic network devices (e.g., splitters) to divide the fiber bandwidth among multiple access points.

SUMMARY

In some implementations, a method may include configuring, by a first network device, a first bridge connecting a passive optical network controller and first optical line terminals of the first network device, wherein the first network device is associated with a passive optical network, and wherein one or more of the first optical line terminals are connected to a first plurality of optical network units. The method may include establishing, by the first network device, a connection between the first bridge and a second bridge of a second network device, wherein the second network device is associated with the passive optical network, wherein the second bridge connects with second optical line terminals of the second network device, and wherein one or more of the second optical line terminals are connected to a second plurality of optical network units. The method may include receiving, by the passive optical network controller of the first network device, traffic from a passive optical network domain manager, and providing, by the passive optical network controller of the first network device, the traffic to the first optical line terminals and the first plurality of optical network units via the first bridge.

In some implementations, a first network device includes a passive optical network controller, one or more memories, and one or more processors to configure a first bridge connecting the passive optical network controller and first optical line terminals, wherein the first network device is associated with a passive optical network, and wherein one or more of the first optical line terminals are connected to a first plurality of optical network units. The one or more processors may establish a connection between the first bridge and a second bridge of a second network device, wherein the second network device is associated with the passive optical network, wherein the second bridge connects with second optical line terminals of the second network device, and wherein one or more of the second optical line terminals are connected to a second plurality of optical network units. The one or more processors may receive, via the passive optical network controller, traffic from a passive optical network domain manager, and may provide, via the passive optical network controller, the traffic to the first optical line terminals and the first plurality of optical network units via the first bridge.

In some implementations, a non-transitory computer-readable medium may store a set of instructions that includes one or more instructions that, when executed by one or more processors of a first network device, cause the first network device to configure a first bridge connecting a passive optical network controller and first optical line terminals of the first network device, wherein the first network device is associated with a passive optical network, and wherein one or more of the first optical line terminals are connected to a first plurality of optical network units. The one or more instructions may cause the first network device to establish a connection between the first bridge and a second bridge of a second network device, wherein the second network device is associated with the passive optical network, wherein the second bridge connects with second optical line terminals of the second network device, and wherein one or more of the second optical line terminals are connected to a second plurality of optical network units. The one or more instructions may cause the first network device to receive, via the passive optical network controller, traffic from a passive optical network domain manager, and provide, via the passive optical network controller, the traffic to the first optical line terminals and the first plurality of optical network units via the first bridge. The one or more instructions may cause the first network device to provide, via the passive optical network controller, the traffic to the second optical line terminals and the second plurality of optical network units via the first bridge and the connection with the second bridge.

BRIEF DESCRIPTION OF THE DRAWINGS

FIG. 5 is a flowchart of an example process for supporting OLTs of a PON.

DETAILED DESCRIPTION

Figure 1A:
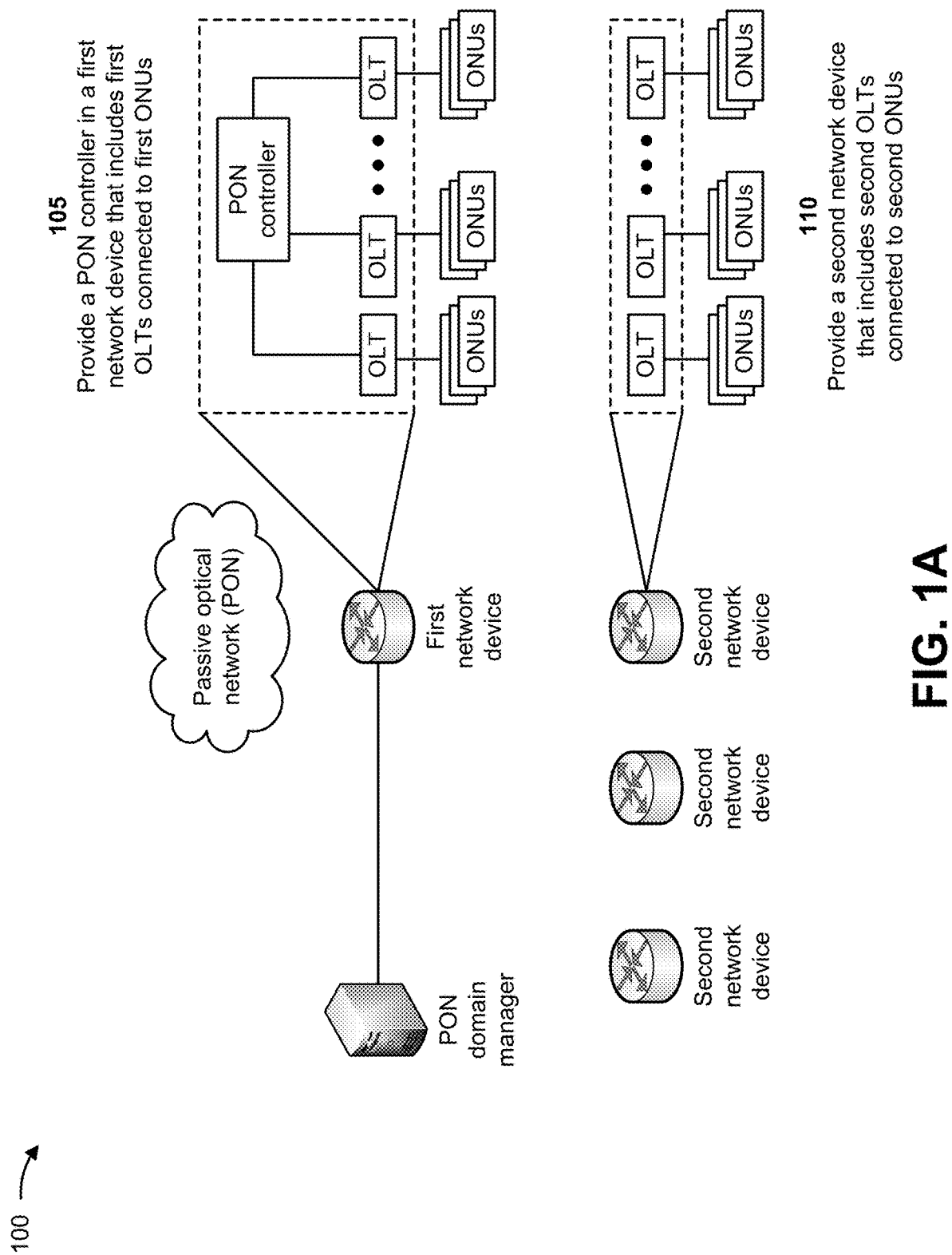
FIGS. 1A-1F are diagrams of an example associated with supporting optical line terminals (OLTs) of a passive optical network (PON).

The following detailed description of example implementations refers to the accompanying drawings. The same reference numbers in different drawings may identify the same or similar elements.

A passive optical network (PON) may include optical line terminals (OLTs) at a central office (e.g., a hub) of a service provider and may include optical network units (ONUs) that are connected to each OLT and are located near premises of end users. A PON domain manager of the PON may configure, monitor, and manage the OLTs and the ONUs connected to the OLTs. Some network devices may include one or more of the OLTs and each OLT may be connected to one or more of the ONUs. A PON controller device may communicate with the PON domain manager to receive data and use the data to configure, monitor, and manage the one or more OLTs and the one or more ONUs of the network devices. Additionally, the PON controller device may communicate with the network devices to obtain data (from the one or more OLTs and the one or more ONUs) and provide the obtained data to the PON domain manager.

With respect to current techniques for communicating with and managing OLTs and ONUs, the PON controller device is a device that is separate and external with respect to the network devices and that configures, monitors, and manages OLTs connected to the network devices and the ONUs connected to the OLTs. Additionally, each network device may only communicate with OLTs that are provided in the network device and communicate with ONUs connected to such OLTs but may not communicate with other OLTs provided in other network devices or communicate with other ONUs connected to the other OLTs. Thus, current techniques for communicating with OLTs and ONUs (e.g., to configure, monitor, and manage the OLTs and ONUs) waste network resources and/or other resources associated with providing a separate PON controller device for communicating with OLTs and associated ONUs of network devices, taking remedial actions with respect to delayed transmission of data between the PON and the OLTs and associated ONUs (e.g., as a result of using the separate PON controller device), taking remedial actions with respect to poor network performance due the delayed transmission of data, among other examples.

Some implementations described herein relate to a network device that supports OLTs of a PON. For example, a first network device may include a PON controller for configuring, monitoring, and managing OLTs provided in the network device and associated ONUs (e.g., local OLTs and ONUs) as well as for configuring, monitoring, and managing OLTs provided in other network devices (e.g., that do not include a PON controller) and associated ONUs (e.g., remote OLTs and ONUs). The first network device may configure a bridge that connects the PON controller to the local OLTs and ONUs and that provides a connection to bridges of the other network devices. A bridge of each of the other network devices may connect the remote OLTs and ONUs of that network device.

The bridge and the connection enable the PON controller to configure, monitor, and manage the local OLTs and ONUs and configure, monitor, and manage the remote OLTs and ONUs. Therefore, the bridge, the connection, and the PON controller (provided in the first network device) enable the first network device to conserve networking resources and/or other resources that would have been consumed by providing a separate PON controller device for communicating with OLTs and associated ONUs of network devices (e.g., to configure, monitor, and manage the OLTs and associated ONUs), taking remedial actions with respect to delayed transmission of data between the PON and the OLTs and associated ONUs (e.g., as a result of using the separate PON controller device), taking remedial actions with respect to poor network performance due the delayed transmission of data, among other examples.

FIGS. 1A-1F are diagrams of an example 100 associated with supporting optical line terminals (OLTs) of a passive optical network (PON). As shown in FIGS. 1A-1F, example 100 includes a PON domain manager associated with a network that includes network devices. In some implementations, the network may include a PON. The PON domain manager may include a server device, a cloud-based device, among other devices that may receive information from and/or provide information to the network devices (e.g., to OLTs of the network devices and/or to ONUs connected to the ONUs), as described herein. In some implementations, the PON domain manager may configure, monitor, and control (or manage) devices associated with the PON. For example, the PON domain manager may configure, monitor, and control OLTs connected to the network devices and ONUs connected to the OLTs.

One or more of the network devices may include a router, a gateway, a switch, a firewall, a hub, a bridge, a reverse proxy, and/or the like. Although FIGS. 1A-1F describe the PON domain manager interacting with four network devices, in some implementations, the PON domain manager may interact with additional or fewer network devices in a similar manner.

As shown in FIG. 1A, and by reference number 105, a PON controller may be provided in a first network device that includes first OLTs connected to first ONUs. In some examples, the PON controller may be provided in a routing component of the first network device and the first OLTs may be provided in a forwarding component (e.g., a packet forwarding component) of the first network device. In some implementations, the first OLTs may be connected to a subset of ports of a plurality of ports of the first network device. The subset of ports (of the first network device) may be referred to as OLT ports of the first network device. In some examples, the first OLTs may include small form-factor pluggable transceivers. The first ONUs may be connected to the first OLTs. For example, one or more ONUs may be connected to a first one of the first OLTs (e.g., by way of a virtual connection or a physical connection), one or more ONUs may be connected to a second one of the first OLTs (e.g., by way of a virtual connection or a physical connection), and so on.

The PON controller may include a component (of the first network device) that communicates with the PON domain manager to receive traffic and use the traffic to configure, monitor, and control operations of devices connected to the plurality of ports (e.g., the first OLTs, the first ONUs, among other examples). The traffic may include packets (from the PON domain manager) to be provided to the devices and packets (from the devices) to be provided to the PON domain manager. The devices may be included in the network (e.g., the PON). In some implementations, the traffic (from the PON domain manager) may include statistics requests to obtain statistics from the devices, configuration requests to obtain information identifying configurations of the devices, and information for configuring the devices.

Based on the statistics requests, the PON controller may obtain the statistics from the devices and provide the statistics to the PON domain manager. Based on the configuration requests, the PON controller may obtain the information identifying configurations from the devices and provide the information identifying the configurations to the PON domain manager. The PON controller may cause the devices to be configured using the information for configuring the devices. In this regard, the PON domain manager may configure, monitor, and manage the first OLTs and the first ONUs via the PON controller. The traffic from the devices towards the PON controller is control traffic that is separate from data traffic between ONUs and OLTs, which data traffic is separated by the OLTs and directed to a different port of the first network device (e.g., different than the ports to which the devices are connected).

In some implementations, the PON controller may communicate with the devices using packets formatted in accordance with Institute of Electrical and Electronics Engineers (IEEE) 1904.02 standard. In some implementations, the PON controller may transmit (e.g., broadcast) messages to discover the devices. As an example, the PON controller may transmit (e.g., broadcast) messages to discover the first OLTs. The first OLTs may provide responses that include addresses of the first OLTs (e.g., network addresses of the first OLTs). For example, a first of the OLTs may provide a first address, a second of the OLTs may provide a second address, and so on. In some examples, the PON controller may communicate with the first OLTs using the addresses of the first OLTs.

As shown in FIG. 1A, and by reference number 110, a second network device that includes second OLTs connected to second ONUs may be provided. The second network device may include a plurality of ports. In some implementations, the second OLTs may be connected to a subset of the plurality of ports. The subset of ports of the second network device may be referred to as OLT ports of the second network device. The second ONUs may be connected to the second OLTs. For example, one or more of the second ONUs may be connected to a first one of the second OLTs (e.g., by way of a virtual connection or a physical connection), one or more of the second ONUs may be connected to a second one of the second OLTs (e.g., by way of a virtual connection or a physical connection), and so on. In some implementations, due to lack of resources of the second network device (e.g., due to lack of computing resources, memory resources, among other resources), the second network device may not include a PON controller. In some examples, the second network device may include a switch and the first network device may include a router.

Figure 1B:
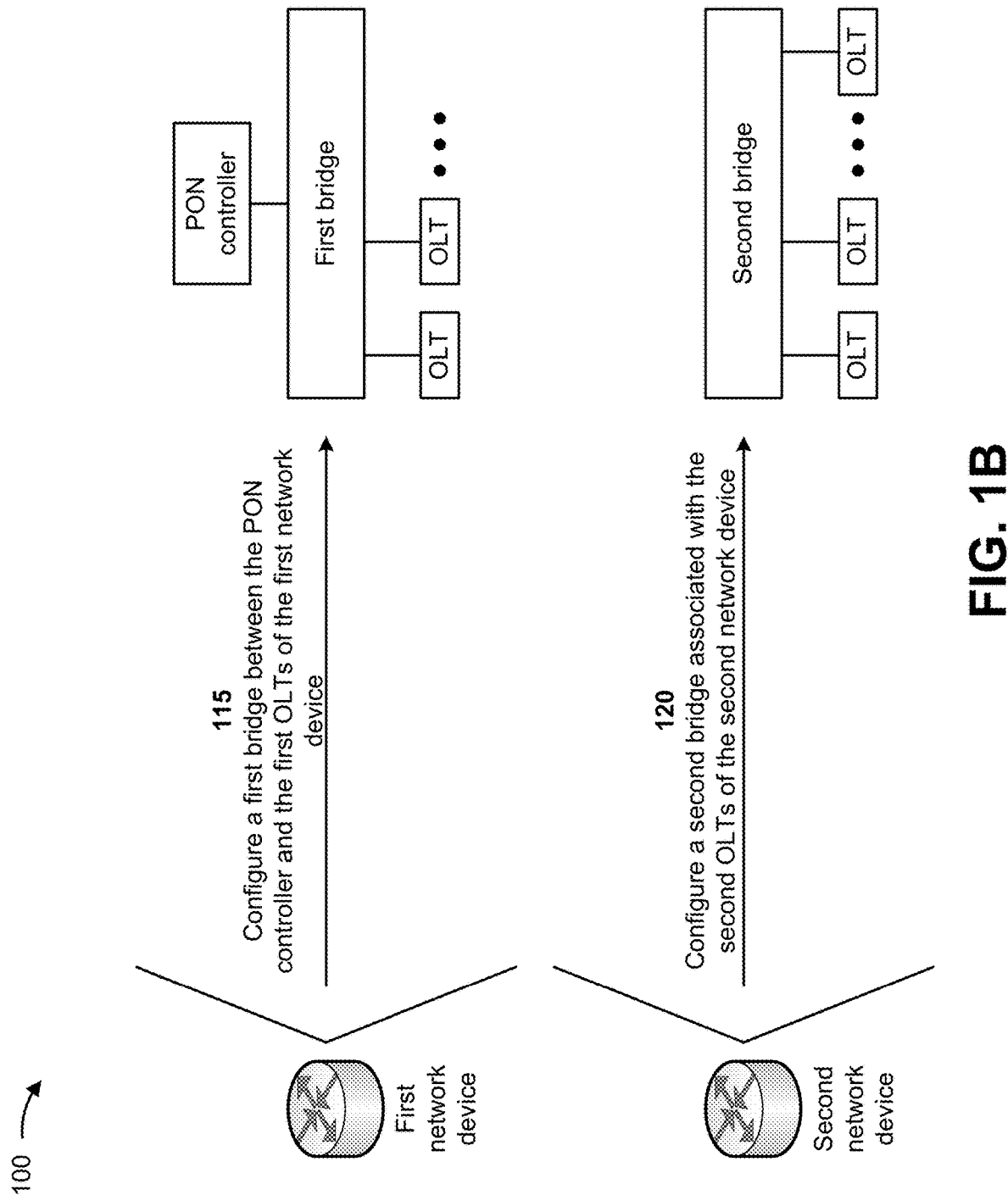

As shown in FIG. 1B, and by reference number 115, the first network device may configure a first bridge between the PON controller and the first OLTs of the first network device. For example, the first bridge may connect the PON controller and the devices connected to the plurality of ports (e.g., the first OLTs, the first ONUs, among other examples). In some implementations, the first bridge may be provided in the forwarding component of the first network device.

In some examples, the first bridge may connect the PON controller and the plurality of ports of the first network device (e.g., including the OLT ports of the first network device). In other words, the first bridge may be a communication bridge between the PON controller and the plurality of ports to enable the PON controller to communicate with the devices connected to the plurality of ports (e.g., the first OLTs, the first ONUs, among other examples). The first bridge may create a secure communication path (e.g., a secure layer 2 (L2) management path) between the PON controller and the devices connected to the plurality of ports whereby the PON controller and the devices may securely communicate.

In some implementations, the first bridge may provide a virtual local area network (VLAN) for the devices connected to the plurality of ports. In some examples, the first network device may be configured to establish the VLAN (e.g., a management VLAN) to enable the traffic (described above) to be securely transmitted between the PON controller and the devices (e.g., the first OLTs, the first ONUs, among other examples). In this regard, the PON controller and the devices may securely communicate using the packets that are formatted in accordance with the IEEE 1904.02 standard and the packets may be transmitted via the VLAN. In some examples, the VLAN may be configured by a user associated with the first network device (e.g., an administrator of the first network device).

In some implementations, particular ports of plurality of ports of the first network device may be associated with the VLAN. In this regard, the particular ports may be VLAN ports. In some examples, logical interfaces may be created for the particular ports.

In some implementations, as part of configuring the first bridge, a bridge domain may be created (e.g., by the user). In some examples, the bridge domain may include information identifying logical interfaces (e.g., network addresses) associated with the particular ports, information identifying the VLAN, among other examples. Information regarding the bridge domain may be stored in a memory of the first network device. In some implementations, the PON controller may be configured to communicate with the devices (e.g., the first OLTs, the first ONUs, among other examples) using the logical interfaces identified by the bridge domain. As an example, the PON controller may access the information regarding the bridge domain, identify the logical interfaces identified by the bridge domain, and communicate with the devices using the logical interfaces.

In some implementations, a layer 2 (L2) management filter (associated with the VLAN) may be created (e.g., by the user). The L2 management filter may be used to identify packets received from the devices (e.g., the first OLTs, the first ONUs, among other examples) that are to be provided to the PON domain manager via the PON controller (e.g., out of all packets received from the devices). In some examples, the L2 management filter may include information identifying a network address of the PON domain manager. The L2 management filter may conserve computing resources (e.g., processing resources, memory resources, and/or the like), networking resources, and/or other resources that would otherwise have been consumed by providing all packets (e.g., from the devices) to the PON domain manager via the PON controller. In some examples, the first network device may be configured to use the L2 management filter to identify packets from a device (e.g., an OLT) upon the first network device detecting a connection by the device to a port of the plurality of ports. In some implementations, the L2 management filter may be provided in the forwarding component of the first network device.

As shown in FIG. 1B, and by reference number 120, the second network device may configure a second bridge associated with the second OLTs of the second network device. The second network device may configure the second bridge in a manner similar to the manner described above with respect to configuring the first bridge. The second bridge may connect the plurality of ports of the second network device. In other words, the second bridge may be a communication bridge between the plurality of ports of the second network device to enable communication with one or more devices connected to one or more of the plurality of ports (e.g., to enable communication with the second OLTs connected to the plurality of ports and enable communication with the second ONUs connected to the second OLTs).

Figure 1C:
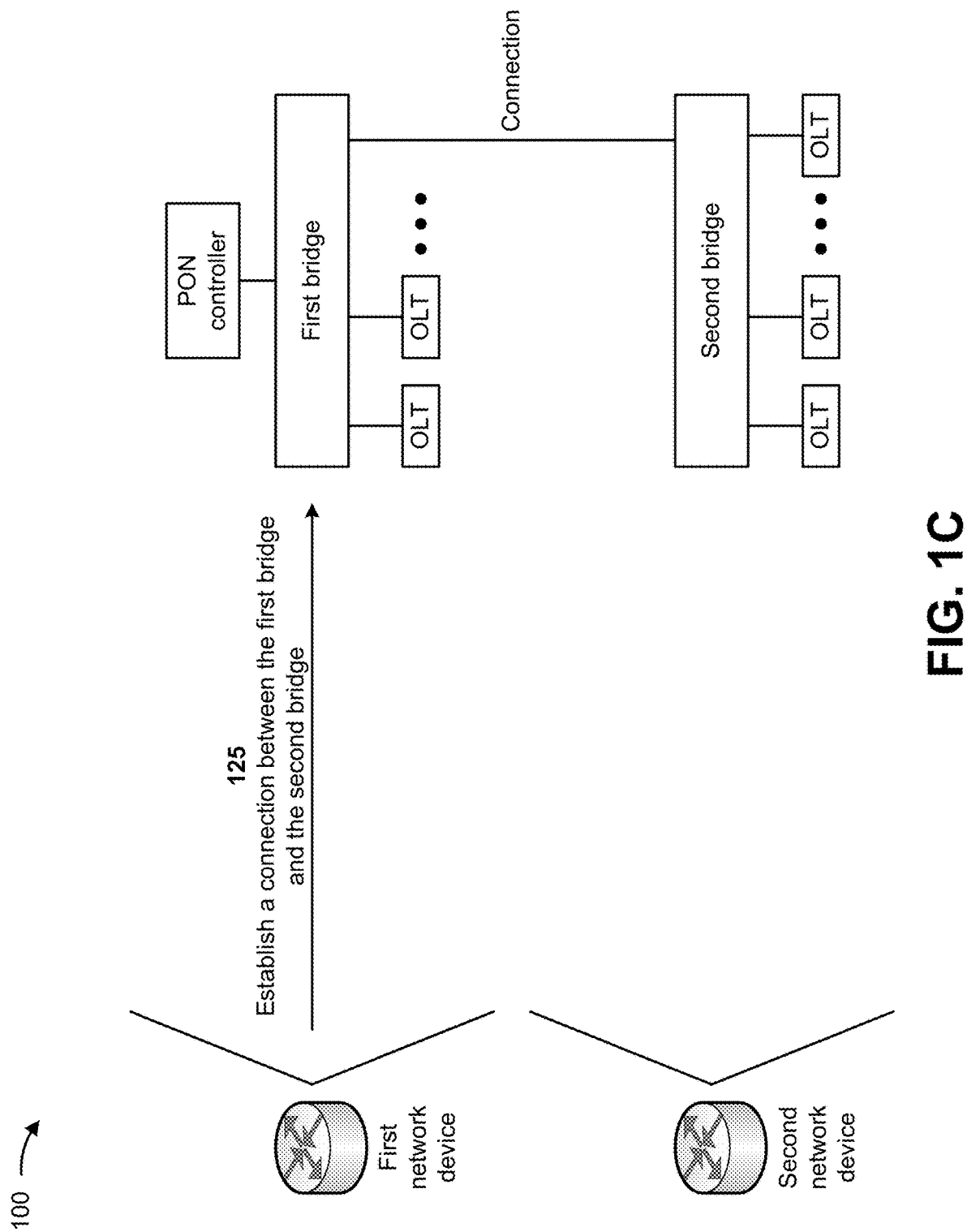

As shown in FIG. 1C, and by reference number 125, the first network device may establish a connection between the first bridge and the second bridge. For example, the first network device may establish a connection between a port of the first network device (e.g., a port different than the OLT ports of the first network device) and a port of the second network device (e.g., a port different than the OLT ports of the second network device).

The port of the first network device (hereinafter referred to as non-OLT port of the first network device) may be included in the first bridge. As explained above, the bridge domain may include the information identifying the logical interfaces associated with the particular ports (of the plurality of ports of the first network device). The particular ports may include the non-OLT port and the information identifying the logical interfaces may include information identifying a logical interface associated with the non-OLT port. In this regard, the non-OLT port (of the first network device) may be included in the first bridge. Additionally, the non-OLT port may be associated with the VLAN. The port of the second network device may be included in the second bridge.

In some implementations, the connection may be established by causing traffic from the non-OLT port to be transmitted to the port of the second network device. For example, a routing data structure (e.g., a routing table), in the first network device, may be updated to indicate that the traffic from the non-OLT port is to be transmitted to the second network device (e.g., to the port of the second network device). As an example, the routing data structure may include information identifying the second network device (e.g., an network address of the second network device), information identifying the port of the second network device (e.g., a port number associated with the port), among other examples.

The PON controller may communicate with the second OLTs and the second ONUs (connected to the second OLTs) via the connection. As an example, the PON controller may communicate with the second OLTs and the second ONUs to configure, monitor, and control the second OLTs and/or the second ONUs, as explained herein. For example, the PON controller may provide packets (e.g., including information for configuring, monitoring, and controlling the second OLTs and/or the second ONUs) to the non-OLT port via the first bridge to cause the packets to be routed towards the port of the second network device. In some instances, the packets may be formatted in accordance with the IEEE 1904.02 standard and may be transmitted from the PON controller to the non-OLT port via the VLAN.

While the example herein describes the connection between the non-OLT port of the first network device and the port of the second network device, the first network device may establish a connection between the non-OLT port of the first network device and a respective port of a plurality of network devices and may communicate with OLTs and/or ONUs of the plurality of network devices in a similar manner.

Figure 1D:
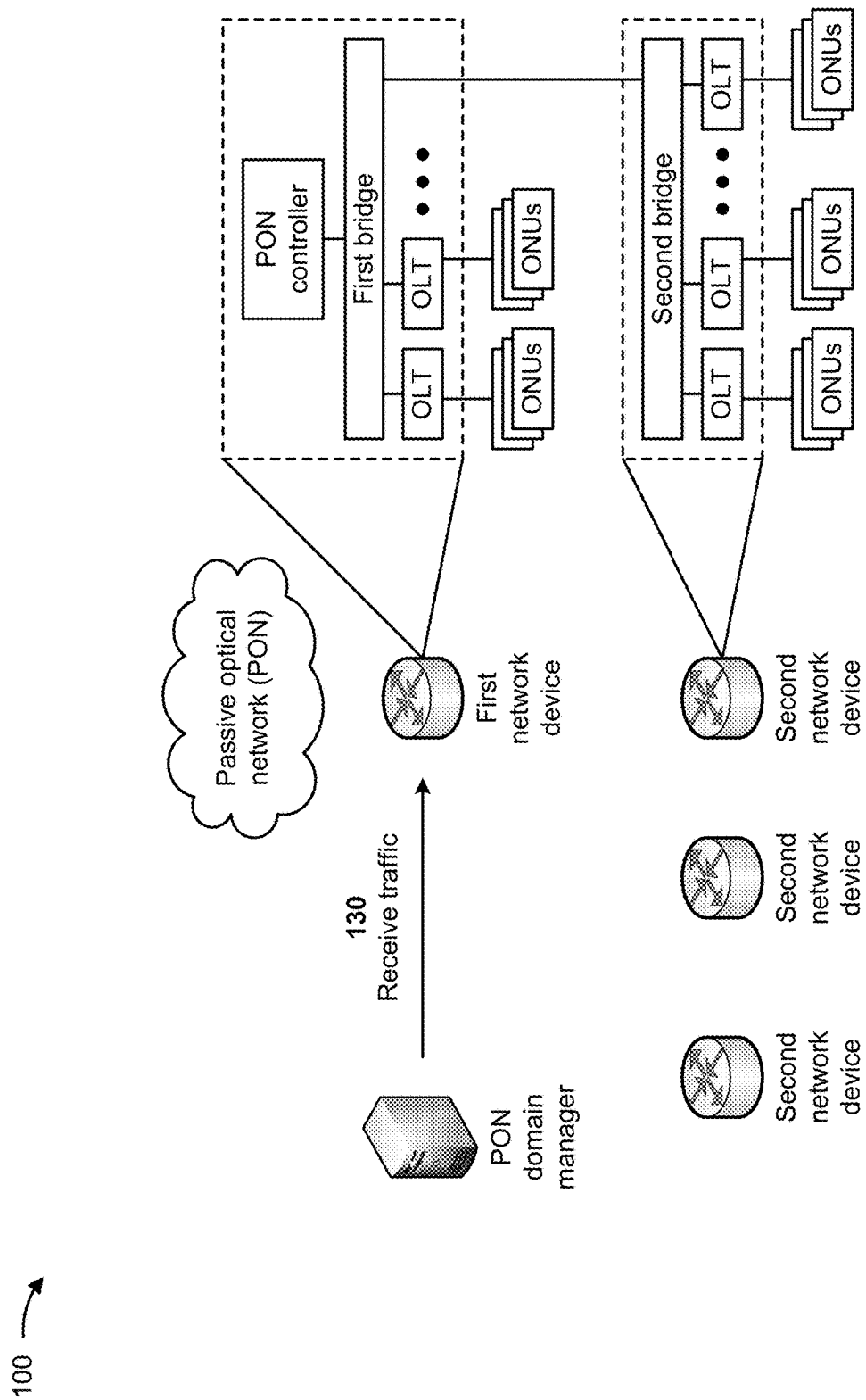

As shown in FIG. 1D, and by reference number 130, the first network device may receive traffic. For example, the PON controller may receive PON traffic from the PON domain manager. In some implementations, the PON traffic may include control traffic. The control traffic may include information that is used to control the first OLTs, the first ONUs, the second OLTs, and/or the second ONUs. In some examples, the control traffic may include information identifying quality of service requirements associated with the network (e.g. associated with the PON), information identifying a traffic limiting requirement associated with the network, among other examples. In some implementations, the PON traffic may include configuration traffic. The configuration traffic may include information that may be used to configure the first OLTs, the first ONUs, the second OLTs, and/or the second ONUs. Additionally, or alternatively, the configuration traffic may be used to request and obtain information regarding configurations of the first OLTs, the first ONUs, the second OLTs, and/or the second ONUs.

In some implementations, the PON traffic may include statistics collection traffic. The statistics collection traffic may be used to request and obtain statistics of the first OLTs, the first ONUs, the second OLTs, and/or the second ONUs. Assume that the PON traffic includes a first portion that is to be provided to one or more first OLTs of the first OLTs and/or one or more first ONUs of the first ONUs and includes a second portion that is to be provided to one or more second OLTs of the second OLTs and/or one or more second ONUs of the second ONUs.

Figure 1E:
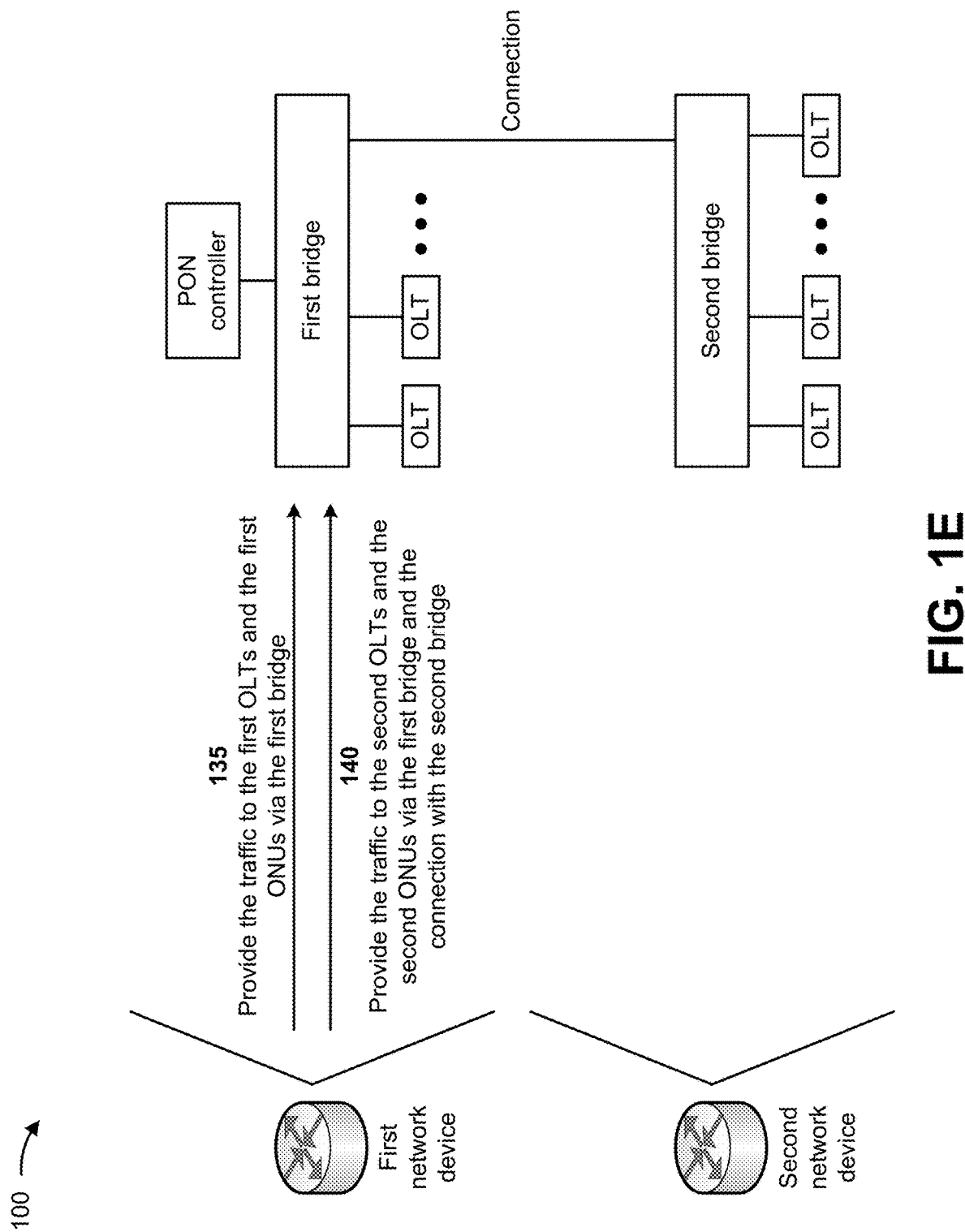

As shown in FIG. 1E, and by reference number 135, the first network device may provide the traffic to the first OLTs and the first ONUs via the first bridge. For example, the PON controller may provide the first portion of the PON traffic to the one or more first OLTs and/or the one or more first ONUs via the first bridge. In some implementations, the PON controller may analyze the PON traffic and identify, based on the analysis, the first portion of the PON traffic that is to be provided to the one or more first OLTs and/or the one or more first ONUs. For example, the PON controller may identify packets (of the PON traffic) that include information identifying the one or more first OLTs and/or the one or more first ONUs (e.g., one or more addresses of the one or more first OLTs and/or the one or more first ONUs), information identifying one or more of the OLT ports of the first network device (e.g., to which the one or more first OLTs are connected) such as one or more port numbers, among other examples.

In some implementations, the PON controller may determine a mapping between the information identifying the one or more first OLTs and the information identifying the one or more of the OLT ports of the first network device (e.g., a first one of the one or more first OLTs may be associated with a first one of the one or more of the OLT ports, a second one of the one or more first OLTs may be associated with a second one of the one or more of the OLT ports, and so on). In some implementations, the PON controller may determine the mapping based on information stored in a memory of the first network device. In some implementations, the PON controller may recognize the one or more first OLTs and/or the one or more first ONUs with respective network addresses of the one or more first OLTs and/or the one or more first ONUs. As an example, the PON controller may obtain the network addresses of the one or more first OLTs and/or the one or more first ONUs (e.g., from a memory of the first network device). Based on the mapping and the network addresses, the PON controller may cause the first portion of the PON traffic to be provided to the one or more of the OLT ports, via the first bridge, for transmission to the one or more first OLTs and/or the one or more first ONUs.

As shown in FIG. 1E, and by reference number 140, the first network device may provide the traffic to the second OLTs and the second ONUs via the first bridge and the connection with the second bridge. For example, the PON controller may provide the second portion of the PON traffic to the one or more second OLTs and/or the one or more second ONUs via the first bridge and the connection with the second bridge. In some implementations, the PON controller may analyze the PON traffic and identify, based on the analysis, the second portion of the PON traffic that is to be provided to the one or more second OLTs and/or the one or more second ONUs.

For example, the PON controller may identify packets (of the PON traffic) that include information identifying the one or more second OLTs and/or the one or more second ONUs (e.g., one or more addresses of the one or more second OLTs and/or of the one or more second ONUs), information identifying the non-OLT port of the first network device (e.g., the port number associated with the non-OLT port), among other examples. In some implementations, the PON controller may determine a mapping between the information identifying the one or more second OLTs and the information identifying the non-OLT port of the first network device. In some implementations, the PON controller may determine the mapping based on information stored in a memory of the first network device.

In some implementations, the PON controller may recognize the one or more second OLTs and/or the one or more second ONUs with respective network addresses of the one or more second OLTs and/or the one or more second ONUs. As an example, the PON controller may obtain the network addresses of the one or more second OLTs and/or the one or more second ONUs (e.g., from a memory of the first network device). Based on the mapping and the network addresses, the PON controller may cause the second portion of the PON traffic to be provided to the non-OLT port, via the first bridge, for transmission to the one or more second OLTs and/or the one or more second ONUs via the connection and the second bridge. The first network device may cause the second portion of the PON traffic to be provided to the second network device via the connection in a manner similar to the manner described above (e.g., to cause the second network device to provide the second portion of the PON traffic to the one or more second OLTs and/or the one or more second ONUs via the second bridge).

Figure 1F:
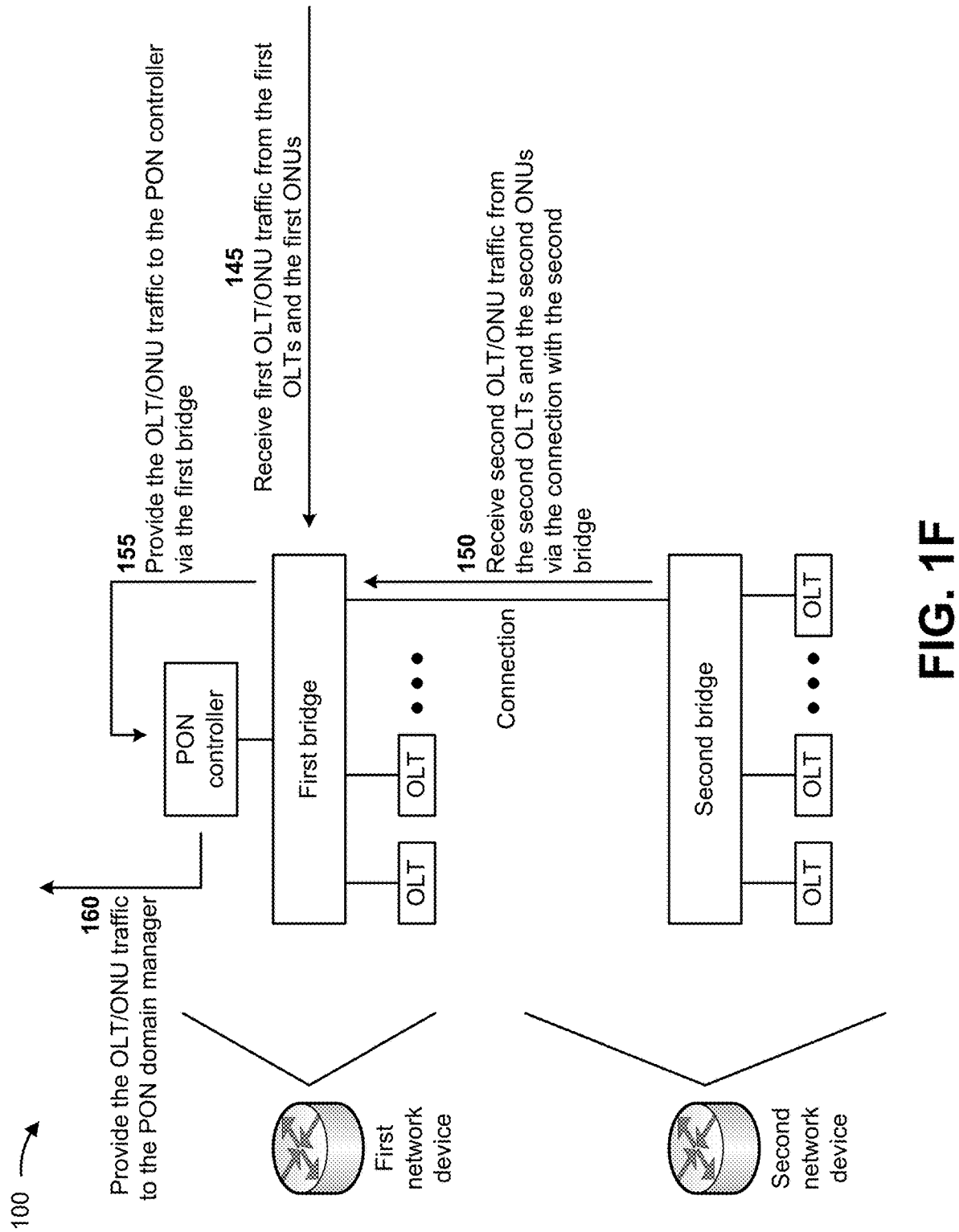

As shown in FIG. 1F, and by reference number 145, the first network device may receive first OLT/ONU traffic from the first OLTs and the first ONUs. For example, the first network device may receive the first OLT/ONU traffic via the one or more of the OLT ports of the first network device (e.g., based on providing the first portion of the PON traffic to the one or more first OLTs and/or the one or more first ONUs). In some examples, the first OLT/ONU traffic may be provided to the first bridge. For instance, the first OLT/ONU traffic may be received by the first bridge via the one or more of the OLT ports. In some implementations, the first OLT/ONU traffic may include information identifying statistics associated with the one or more first OLTs and/or the one or more first ONUs. For example, for each of the one or more first OLTs and/or the one or more first ONUs, the information identifying the statistics may include information identifying an address (e.g., a network address) of the first OLT or first ONU along with information identifying a quantity of packets received by the first OLT or first ONU, information identifying a quantity of packets transmitted by the first OLT or first ONU, data transmission speed, among other examples. Additionally, or alternatively, the first OLT/ONU traffic may include information identifying a configuration of the one or more first OLTs and/or the one or more first ONUs. For example, for each of the one or more first OLTs and/or the one or more first ONUs, the information identifying the configuration may include information identifying an address (e.g., a network address) of the first OLT or first ONU along with information identifying one or more protocols, one or more VLANs, one or more ports (e.g., associated with the one or more VLANs), among other examples.

As shown in FIG. 1F, and by reference number 150, the first network device may receive second OLT/ONU traffic from the second OLTs and the second ONUs via the connection with the second bridge. For example, the second network device may receive the second OLT/ONU traffic (from the one or more second OLTs and/or the one or more second ONUs) via the OLT ports of the second network device (e.g., based on providing the second portion of the PON traffic to the one or more second OLTs and/or the one or more second ONUs). The second network device may cause the second OLT/ONU traffic to be provided via the second bridge to the port of the second network device and cause the second OLT/ONU traffic to be provided to (e.g., routed to) the non-OLT port via the connection. In some examples, the second OLT/ONU traffic may be provided to the first bridge. For instance, the second OLT/ONU traffic may be received by the first bridge via the non-OLT port.

In some implementations, the second OLT/ONU traffic may include information identifying statistics associated with the one or more second OLTs and/or the one or more second ONUs. For example, for each of the one or more second OLTs and/or the one or more second ONUs, the information identifying the statistics may include information identifying an address (e.g., a network address) of the second OLT or second ONU along with information identifying a quantity of packets received, information identifying a quantity of packets transmitted, data transmission speed, among other examples.

Additionally, or alternatively, the second OLT/ONU traffic may include information identifying a configuration of the one or more second OLTs and/or the one or more second ONUs. For example, for each of the one or more second OLTs and/or the one or more second ONUs, the information identifying the configuration may information identifying an address (e.g., a network address) of the second OLT or second ONU along with information identifying one or more protocols, one or more VLANs, one or more ports (e.g., associated with the one or more VLANs), among other examples. The first OLT/ONU traffic and the second OLT/ONU traffic may be collectively referred to as OLT/ONU traffic. The OLT/ONU traffic towards the PON controller is control traffic that is separate from data traffic between ONUs and OLTs, which data traffic is separated by the OLTs and directed to a different port of the first network device (e.g., different than the ports to which the OLTs are connected).

As shown in FIG. 1F, and by reference number 155, the first network device may provide the OLT/ONU traffic to the PON controller. In some implementations, the OLT/ONU traffic may be filtered using the L2 management filter and the filtered OLT/ONU traffic may be forwarded to the PON controller via the first bridge, in a manner similar to the manner described above.

As shown in FIG. 1F, and by reference number 160, the first network device may provide the OLT/ONU traffic to the PON domain manager. For example, the PON controller may provide the filtered OLT/ONU traffic to the PON domain manager to enable the PON domain manager to take one or more actions regarding the network (e.g., the PON). For example, based on receiving the filtered OLT/ONU traffic, the PON domain manager may adjust a configuration of the network, adjust a configuration of the first OLTs, adjust a configuration of the second OLTs, adjust a configuration of the first ONUs, adjust a configuration of the second ONUs, among other examples.

Providing a PON controller in a network device and by configuring the bridges as described herein, enables the network device to conserve networking resources and/or other resources that would have been consumed by providing a separate PON controller device for communicating with OLTs and associated ONUs of network devices, taking remedial actions with respect to delayed transmission of data between the PON and the OLTs and associated ONUs (e.g., as a result of using the separate PON controller device), taking remedial actions with respect to poor network performance due the delayed transmission of data, among other examples. Additionally, the PON controller may configure, monitor, and control OLTs of a plurality of network devices and/or ONUS connected to the OLTs.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
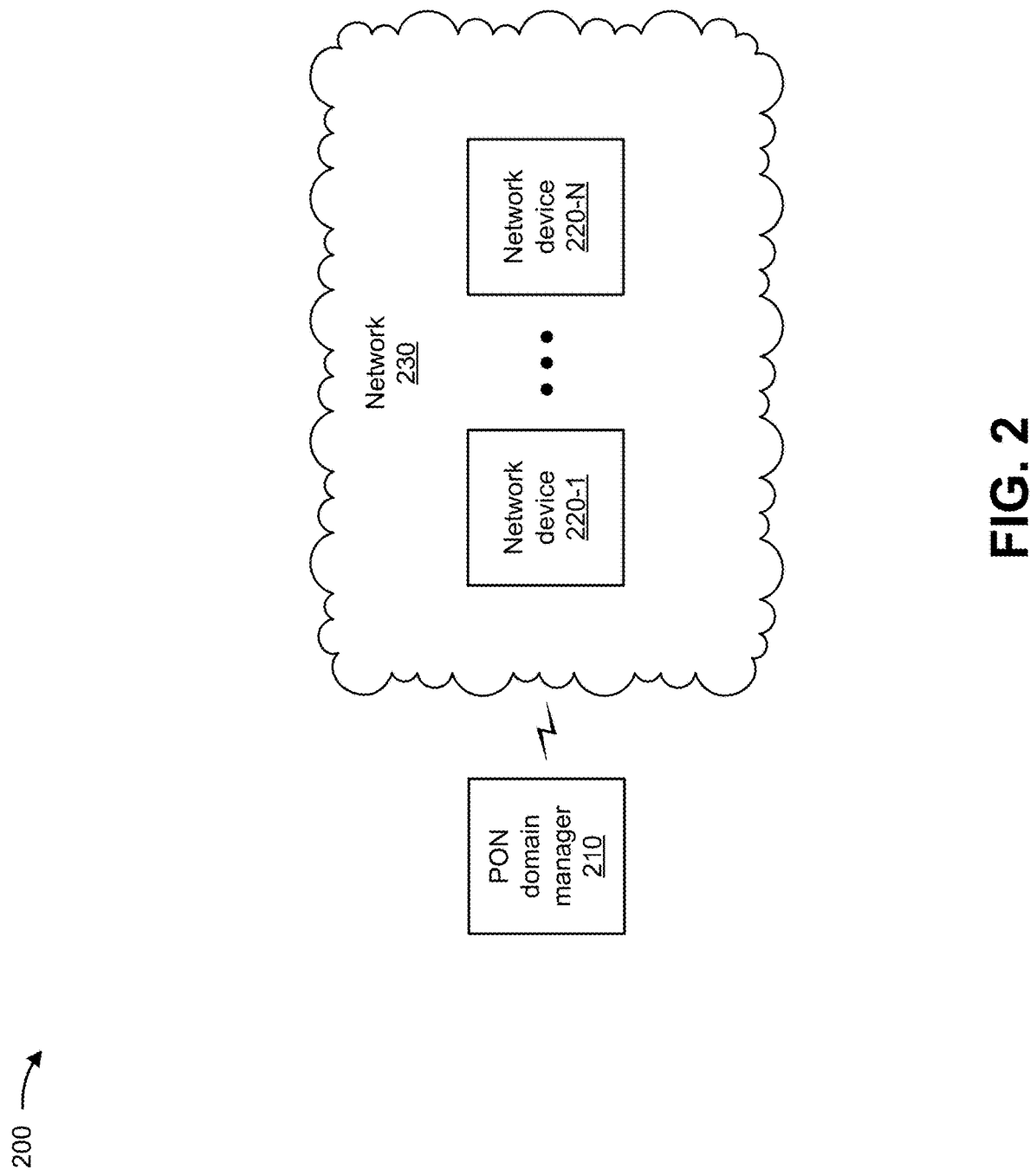
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a PON domain manager 210, a group of network devices 220 (shown as network device 220-1 through network device 220-N), and a network 230. Devices of environment 200 may interconnect via wired connections, wireless connections, or a combination of wired and wireless connections.

PON domain manager 210 includes one or more devices capable of receiving, generating, storing, processing, providing, and/or routing information, as described elsewhere herein. PON domain manager 210 may include a communication device. For example, PON domain manager 210 may include a server, such as an application server, a client server, a web server, a database server, a host server, a proxy server, a virtual server (e.g., executing on computing hardware), a data center server, or a server in a cloud computing system. In some implementations, PON domain manager 210 includes computing hardware used in a cloud computing environment.

Network device 220 includes one or more devices capable of receiving, processing, storing, routing, and/or providing traffic (e.g., a payload packet, an application, etc.) in a manner described herein. For example, network device 220 may include a router, such as a label switching router (LSR), a label edge router (LER), an ingress router, an egress router, a provider router (e.g., a provider edge router, a provider core router, etc., a virtual router, and/or the like). Additionally, or alternatively, network device 220 may include a gateway, a switch, a firewall, a hub, a bridge, a reverse proxy, a server (e.g., a proxy server, a cloud server, a data center server, etc.), a load balancer, and/or a similar device.

In some implementations, network device 220 may be a physical device implemented within a housing, such as a chassis. In some implementations, network device 220 may be a virtual device implemented by one or more computer devices of a cloud computing environment or a data center. In some implementations, network device 220 may be an edge network device in network 230. In some implementations, network device 220 may be an intermediary network device in network 230 (i.e., a network device between two or more edge network devices).

Network 230 includes one or more wired and/or wireless networks. For example, network 230 may include a PON, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
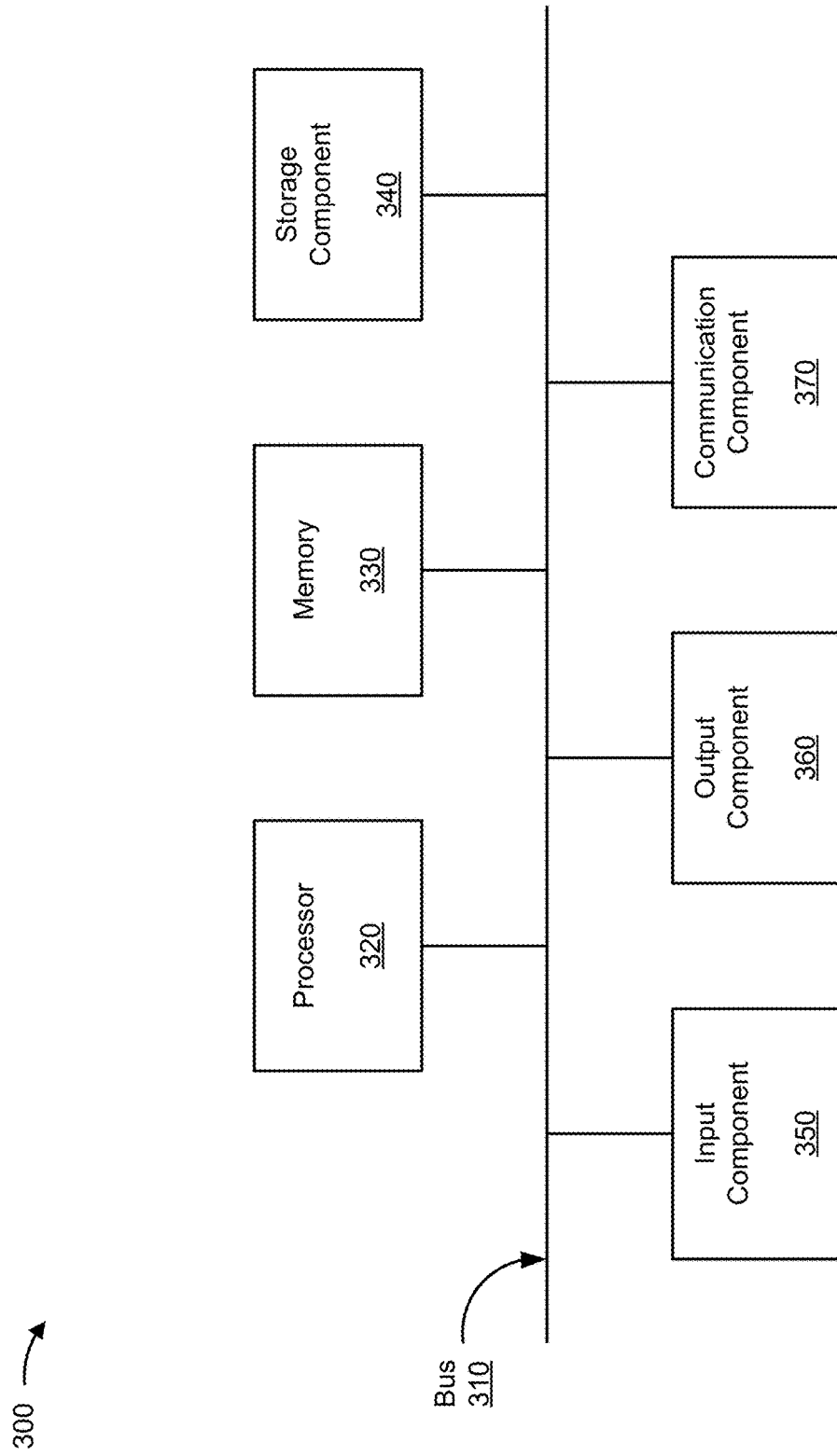
FIGS. 3 and 4 are diagrams of example components of one or more devices of FIG. 2.

FIG. 3 is a diagram of example components of one or more devices of FIG. 2. The example components may be included in a device 300, which may correspond to PON domain manager 210 and/or network device 220. In some implementations, PON domain manager 210 and/or network device 220 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
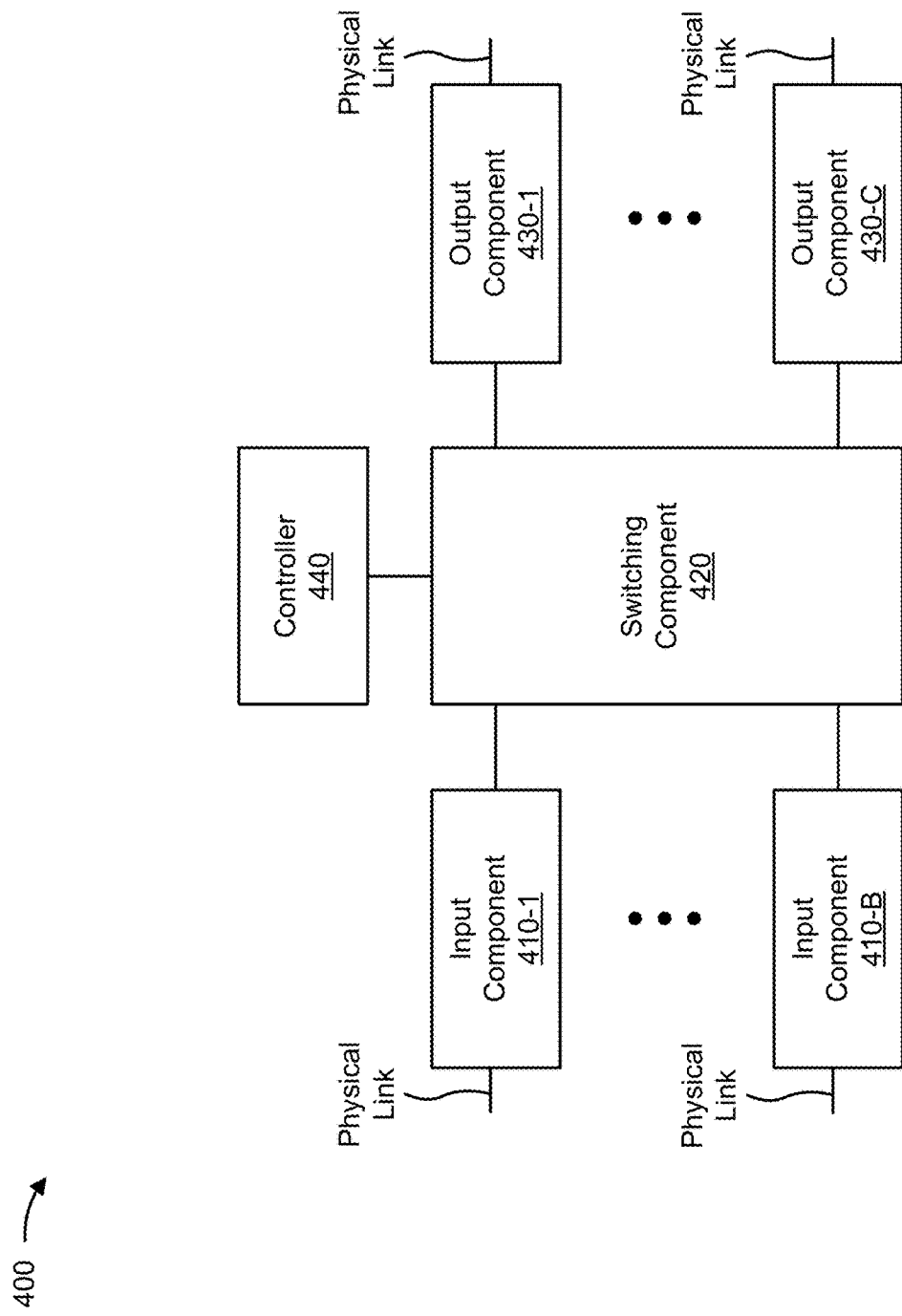

FIG. 4 is a diagram of example components of one or more devices of FIG. 2. The example components may be included in a device 400. Device 400 may correspond to network device 220. In some implementations, network device 220 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C(C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 for supporting OLTs of a PON. In some implementations, one or more process blocks of FIG. 5 may be performed by a network device (e.g., network device 220). In some implementations, one or more process blocks of FIG. 5 may be performed by another device or a group of devices separate from or including the device, such as a PON domain manager (e.g., PON domain manager 210). Additionally, or alternatively, one or more process blocks of FIG. 5 may be performed by one or more components of device 300, such as processor 320, memory 330, storage component 340, input component 350, output component 360, and/or communication component 370. Additionally, or alternatively, one or more process blocks of FIG. 5 may be performed by one or more components of device 400, such as input component 410, switching component 420, output component 430, and/or controller 440.

As shown in FIG. 5, process 500 may include configuring a first bridge connecting a passive optical network controller and first optical line terminals of the first network device, wherein the first network device is associated with a passive optical network, and wherein each of the first optical line terminals are connected to a first plurality of optical network units (block 510). For example, the first network device may configure a first bridge connecting a passive optical network controller and first optical line terminals of the first network device, as described above. In some implementations, the first network device is associated with a passive optical network, and each of the first optical line terminals are connected to a first plurality of optical network units. The first bridge provides a virtual local area network for the first optical line terminals As further shown in FIG. 5, process 500 may include establishing a connection between the first bridge and a second bridge of a second network device, wherein the second network device is associated with the passive optical network, wherein the second bridge connects with second optical line terminals of the second network device, and wherein each of the second optical line terminals are connected to a second plurality of optical network units (block 520). For example, the first network device may establish a connection between the first bridge and a second bridge of a second network device, as described above.

In some implementations, the second network device is associated with the passive optical network, and the second bridge connects with second optical line terminals of the second network device. In some implementations, each of the second optical line terminals are connected to a second plurality of optical network units. In some implementations, the connection is established between the first bridge and the second bridge via a port, of the first network device, that is capable of connecting to one of the first optical line terminals As further shown in FIG. 5, process 500 may include the passive optical network controller receiving traffic from a passive optical network domain manager (block 530). For example, the passive optical network controller may receive traffic from a passive optical network domain manager, as described above.

As further shown in FIG. 5, process 500 may include the passive optical network controller providing the traffic to the first optical line terminals and the first plurality of optical network units via the first bridge (block 540). For example, the passive optical network controller may provide the traffic to the first optical line terminals and the first plurality of optical network units via the first bridge, as described above.

Process 500 may include additional implementations, such as any single implementation or any combination of implementations described below and/or in connection with one or more other processes described elsewhere herein.

In a first implementation, process 500 includes providing, by the passive optical network controller, the traffic to the second optical line terminals and the second plurality of optical network units via the first bridge and the connection with the second bridge.

In a second implementation, alone or in combination with the first implementation, the traffic includes one or more of traffic to be provided to the first optical line terminals, traffic to be provided to the first plurality of optical network units, traffic to be provided to the second optical line terminals, or traffic to be provided to the second plurality of optical network units.

In a third implementation, alone or in combination with one or more of the first and second implementations, process 500 includes receiving, by the first bridge, other traffic from the second optical line terminals or the second plurality of optical network units via the connection with the second bridge; and providing, by the first bridge, the other traffic to the passive optical network controller.

In a fourth implementation, alone or in combination with one or more of the first through third implementations, process 500 includes providing, by the passive optical network controller, the other traffic to the passive optical network domain manager.

In a fifth implementation, alone or in combination with one or more of the first through fourth implementations, the other traffic includes traffic identifying statistics associated with the second optical line terminals or the second plurality of optical network units.

In a sixth implementation, alone or in combination with one or more of the first through fifth implementations, the first network device includes a router or a switch and the second network device includes a switch.

In a seventh implementation, alone or in combination with one or more of the first through sixth implementations, the passive optical network controller is provided in a routing component of the first network device, and the first bridge is provided in a forwarding component of the first network device.

In an eighth implementation, alone or in combination with one or more of the first through seventh implementations, the traffic includes one or more of controlling traffic, configuration traffic, or statistics collection traffic.

In a ninth implementation, alone or in combination with one or more of the first through eighth implementations, process 500 includes receiving, by the first bridge, other traffic from the first optical line terminals or the first plurality of optical network units; providing, by the first bridge, the other traffic to the passive optical network controller; and providing, by the passive optical network controller, the other traffic to the passive optical network domain manager.

In a tenth implementation, alone or in combination with one or more of the first through ninth implementations, the other traffic includes traffic identifying statistics associated with the first optical line terminals or the first plurality of optical network units.

In an eleventh implementation, alone or in combination with one or more of the first through tenth implementations, the first bridge provides a virtual local area network for the first optical line terminals.

In a twelfth implementation, alone or in combination with one or more of the first through eleventh implementations, the connection is established between the first bridge and the second bridge via a port of the first network device that is capable of connecting to one of the first optical line terminals.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    configuring, by a first network device, a first bridge connecting a passive optical network controller and first optical line terminals of the first network device,
        wherein the first network device is associated with a passive optical network, and
        wherein one or more of the first optical line terminals are connected to a first plurality of optical network units;
    establishing, by the first network device, a connection between the first bridge and a second bridge of a second network device,
        wherein the second network device is associated with the passive optical network,
        wherein the second bridge connects with second optical line terminals of the second network device, and
        wherein one or more of the second optical line terminals are connected to a second plurality of optical network units;
    receiving, by the passive optical network controller of the first network device, traffic from a passive optical network domain manager; and
    providing, by the passive optical network controller of the first network device, the traffic to the first optical line terminals and the first plurality of optical network units via the first bridge.

2. The method of claim 1, further comprising:
    providing, by the passive optical network controller, the traffic to the second optical line terminals and the second plurality of optical network units via the first bridge and the connection with the second bridge.

3. The method of claim 1, wherein the traffic includes one or more of:
    traffic to be provided to the first optical line terminals,
    traffic to be provided to the first plurality of optical network units,
    traffic to be provided to the second optical line terminals, or
    traffic to be provided to the second plurality of optical network units.

4. The method of claim 1, further comprising:
    receiving, by the first bridge, other traffic from the second optical line terminals or the second plurality of optical network units via the connection with the second bridge; and
    providing, by the first bridge, the other traffic to the passive optical network controller.

5. The method of claim 4, further comprising:
    providing, by the passive optical network controller, the other traffic to the passive optical network domain manager.

6. The method of claim 4, wherein the other traffic includes traffic identifying statistics associated with the second optical line terminals or the second plurality of optical network units.

7. The method of claim 1, wherein the first network device includes a router or a switch and the second network device includes a switch.

8. A first network device, comprising:
    a passive optical network controller;
    one or more memories; and
    one or more processors to:
        configure a first bridge connecting the passive optical network controller and first optical line terminals,
            wherein the first network device is associated with a passive optical network, and
            wherein one or more of the first optical line terminals are connected to a first plurality of optical network units;
        establish a connection between the first bridge and a second bridge of a second network device,
            wherein the second network device is associated with the passive optical network,
            wherein the second bridge connects with second optical line terminals of the second network device, and
            wherein one or more of the second optical line terminals are connected to a second plurality of optical network units;
        receive, via the passive optical network controller, traffic from a passive optical network domain manager; and
        provide, via the passive optical network controller, the traffic to the first optical line terminals and the first plurality of optical network units via the first bridge.

9. The first network device of claim 8, wherein the passive optical network controller is provided in a routing component of the first network device, and the first bridge is provided in a forwarding component of the first network device.

10. The first network device of claim 8, wherein the traffic includes one or more of:
    control traffic,
    configuration traffic, or
    statistics collection traffic.

11. The first network device of claim 8, wherein the one or more processors are further to:

receive, via the first bridge, other traffic from the first optical line terminals or the first plurality of optical network units;

provide, via the first bridge, the other traffic to the passive optical network controller; and provide, via the passive optical network controller, the other traffic to the passive optical network domain manager.

12. The first network device of claim 11, wherein the other traffic includes traffic identifying statistics associated with the first optical line terminals or the first plurality of optical network units.

13. The first network device of claim 8, wherein the first bridge provides a virtual local area network for the first optical line terminals.

14. The first network device of claim 8, wherein the connection is established between the first bridge and the second bridge via a port, of the first network device, that is capable of connecting to one of the first optical line terminals.

15. A non-transitory computer-readable medium storing a set of instructions, the set of instructions comprising:

one or more instructions that, when executed by one or more processors of a first network device, cause the first network device to:

configure a first bridge connecting a passive optical network controller and first optical line terminals of the first network device,
wherein the first network device is associated with a passive optical network, and
wherein one or more of the first optical line terminals are connected to a first plurality of optical network units;

establish a connection between the first bridge and a second bridge of a second network device,
wherein the second network device is associated with the passive optical network,
wherein the second bridge connects with second optical line terminals of the second network device, and
wherein one or more of the second optical line terminals are connected to a second plurality of optical network units;

receive, via the passive optical network controller, traffic from a passive optical network domain manager;

provide, via the passive optical network controller, the traffic to the first optical line terminals and the first plurality of optical network units via the first bridge; and provide, via the passive optical network controller, the traffic to the second optical line terminals and the second plurality of optical network units via the first bridge and the connection with the second bridge.

16. The non-transitory computer-readable medium of claim 15, wherein the one or more instructions further cause the first bridge to:

receive, via the first bridge, other traffic from the second optical line terminals or the second plurality of optical network units via the connection with the second bridge;

provide, via the first bridge, the other traffic to the passive optical network controller;

provide, via the passive optical network controller, the other traffic to the passive optical network domain manager.

17. The non-transitory computer-readable medium of claim 16, wherein the other traffic includes traffic identifying statistics associated with the second optical line terminals or the second plurality of optical network units.

18. The non-transitory computer-readable medium of claim 15, wherein the passive optical network controller is provided in a routing component of the first network device, and the first bridge is provided in a forwarding component of the first network device.

19. The non-transitory computer-readable medium of claim 15, wherein the one or more instructions further cause the first bridge to:

receive, via the first bridge, other traffic from the first optical line terminals or the first plurality of optical network units;

provide, via the first bridge, the other traffic to the passive optical network controller; and provide, via the passive optical network controller, the other traffic to the passive optical network domain manager.

20. The non-transitory computer-readable medium of claim 19, wherein the other traffic includes traffic identifying statistics associated with the first optical line terminals or the first plurality of optical network units.

* * * * *